June 11, 1957   C. HOOK   2,795,202
HYDROFOIL CRAFT

Filed Aug. 18, 1954   3 Sheets-Sheet 1

INVENTOR:
CHRISTOPHER HOOK
BY:

June 11, 1957  C. HOOK  2,795,202
HYDROFOIL CRAFT
Filed Aug. 18, 1954  3 Sheets-Sheet 2
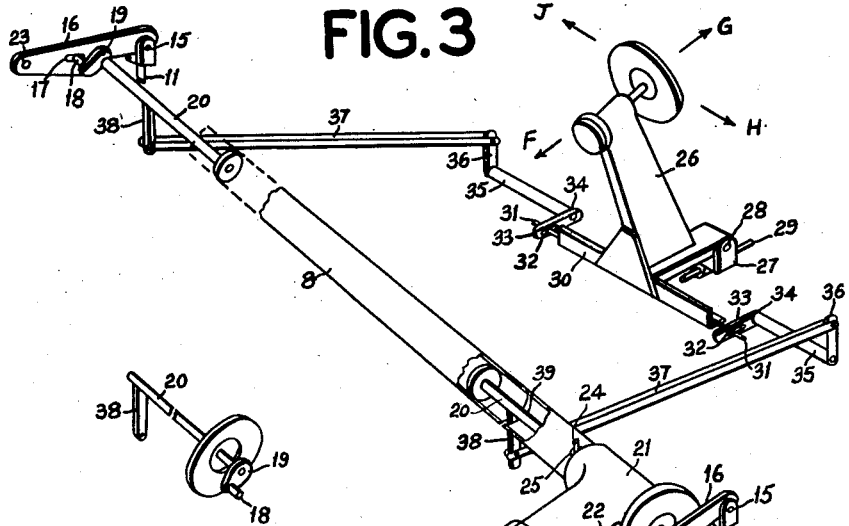
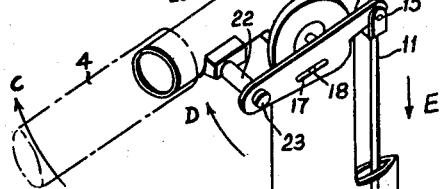
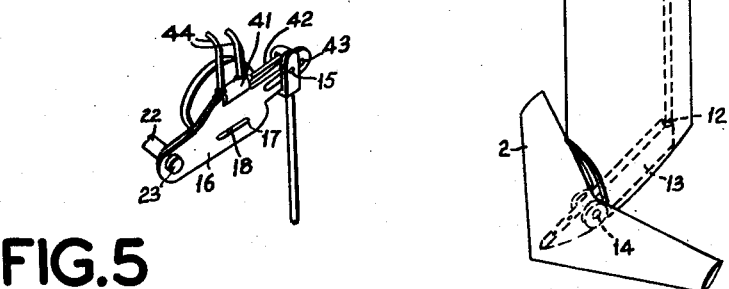
INVENTOR:
CHRISTOPHER HOOK
BY:

June 11, 1957  C. HOOK  2,795,202
HYDROFOIL CRAFT
Filed Aug. 18, 1954  3 Sheets-Sheet 3
FIG.6
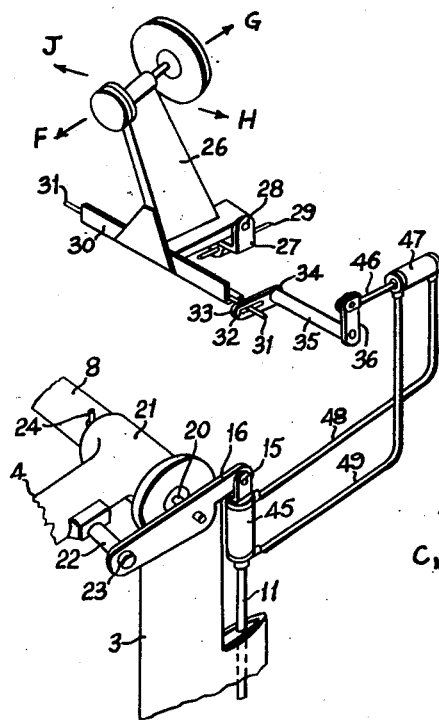
FIG.7
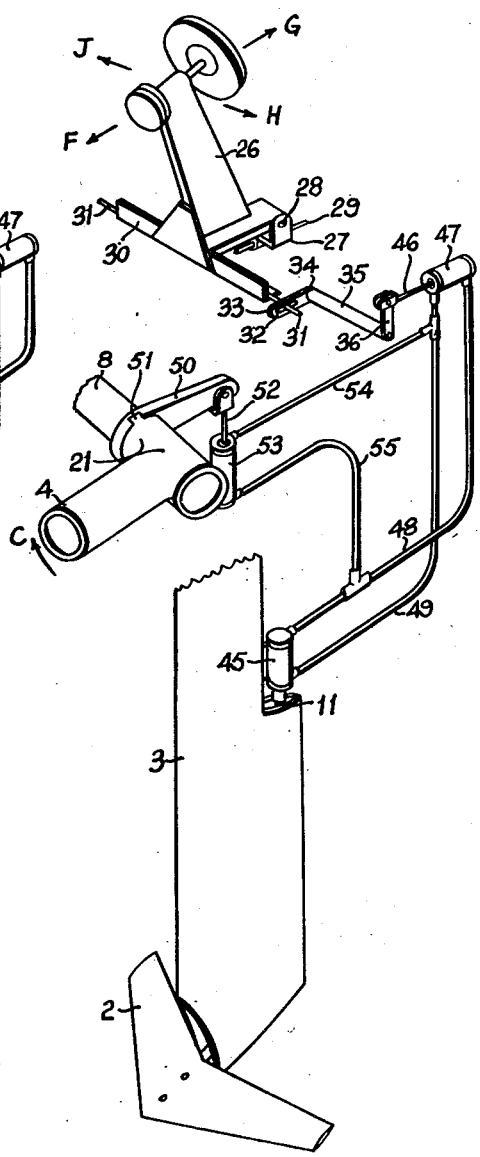
FIG.8
INVENTOR:
CHRISTOPHER HOOK
BY:

United States Patent Office 2,795,202
Patented June 11, 1957

2,795,202

HYDROFOIL CRAFT

Christopher Hook, Miami, Fla.

Application August 18, 1954, Serial No. 450,644

10 Claims. (Cl. 114—66.5)

This invention relates to hydrofoil craft in which the angle of incidence of the hydrofoil or hydrofoils is controlled automatically in dependence on the shape of the water surface a short distance ahead of the craft. Automatic control of the angle of incidence of the hydrofoil or hydrofoils may be obtained by means of one or more floats or skids adapted to follow the wave surface ahead of the craft, each float or skid being connected to its associated hydrofoil through a suitable mechanical linkage as described in my prior U. S. Patent No. 2,387,907, dated October 30, 1945.

Hydrofoil craft, which are capable of high speeds, are very suitable for naval purposes, since they are able to make high speed dashes over rough water. However, when such craft are travelling at slow speed with the hull resting on the water the submerged hydrofoils and their supporting struts cause a considerable drag on the craft. Again hydrofoil craft cannot be used in shallow water or as beach landing craft without serious damage to the hydrofoils.

The main object of the present invention is a hydrofoil craft which can be used effectively at slow speeds and in shallow water and which can be employed as a beach landing craft.

According to the invention a hydrofoil craft comprises two struts, one arranged on each side of the craft, two hydrofoils, one pivotally mounted on each strut, means for varying automatically the angles of incidence of the two hydrofoils in dependence on the shape of the water surface ahead of the craft, and means mounting each strut movably in relation to the hull of the craft in order to reduce the draught of the craft.

Figure 1:
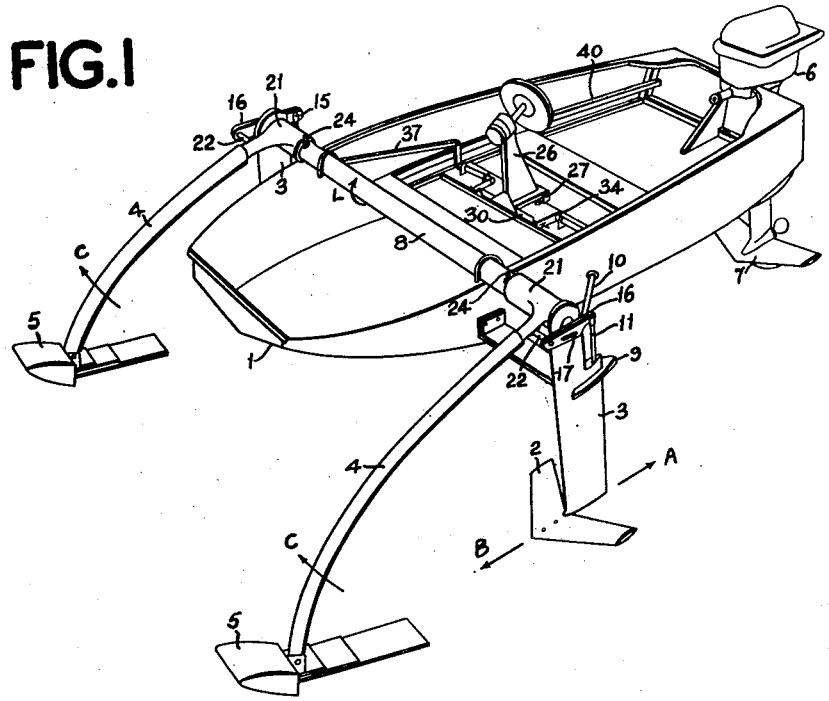
Figure 2:
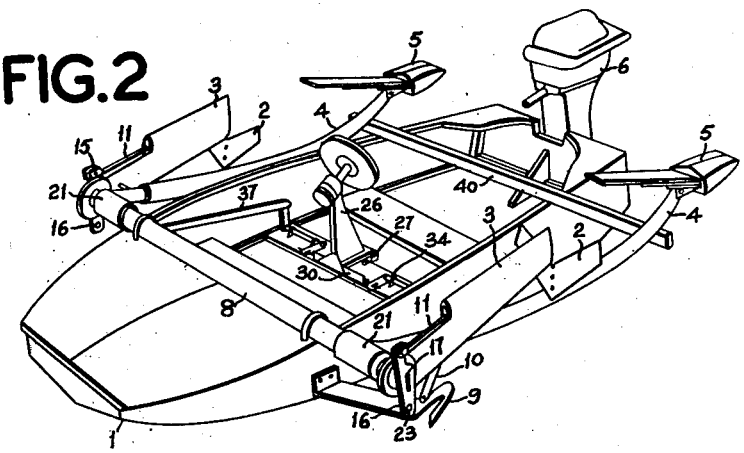

Various embodiments of hydrofoil craft according to the invention will now be described with reference to the accompanying drawings, in which Figure 1 is a perspective view of a hydrofoil craft with its hydrofoils and automatic incidence control mechanism in their normal operative positions, Figure 2 is a perspective view of the craft according to Figure 1 with the hydrofoils and the automatic incidence control mechanism in their retracted positions, Figure 3 is a perspective view on an enlarged scale of the manual and automatic incidence control mechanisms of the craft shown in Figures 1 and 2, Figure 4 is a perspective view of a detail of Figure 3, Figure 5 is a perspective view of a modified form of a detail of Figure 3, Figure 6 is a perspective view of the hydrofoil incidence control apparatus in a modified form of hydrofoil craft, Figure 7 is a perspective view of the hydrofoil incidence control apparatus in a further modified form of hydrofoil craft, and Figure 8 is a perspective view of a modified form of a detail of Figure 7.

Referring to Figures 1 to 4, the hydrofoil craft illustrated comprises a hull 1, two forward variable incidence hydrofoils 2 pivotally mounted on struts 3, jockey arms 4 carrying feeler floats 5 at their forward ends, an engine and propeller unit 6 and a rear hydrofoil 7.

The upper ends of the two struts 3 are rotatably mounted at the ends of a tube 8 which is secured to the hull 1 transversely of the latter. Rotation of the struts 3 about the tube 8 in the direction of the arrow A (Figure 1) is limited by spars 9, one on each side of the hull 1, which spars are suitably braced by means of stays 10. The struts 3 may be locked to the spars 9 by any suitable locking means (not shown) to prevent undesired rotation of the struts in the direction of the arrow B (for example when the craft is moving astern with the hull resting on the water).

Control of the angle of incidence of the hydrofoils 2 is brought about through incidence command rods 11 which pass through the struts 3. One end of each incidence command rod 11 is pivotally connected at 12 to a rearward extension 13 on its associated hydrofoil 2, the latter being pivoted at 14 to the strut 3. While the drawings show the hydrofoils 2 pivoted to the struts 3 near the forward edge of the latter, it will be appreciated that the hydrofoils 2 may be pivoted at any other point to the lower end of the struts 3. The other end of each command rod 11 is pivotally connected at 15 to one end of an arm 16, each arm 16 being provided with a slot 17 intermediate its ends which receives the pin 18 of an eccentric 19 (see Figure 4). The eccentrics 19 are each mounted at one end of a shaft 20, the two shafts 20 being arranged transversely with respect to the hull 1 and mounted for rotation inside the tube 8. The longitudinal axes of the shafts 20 and the tube 8 coincide with one another. Each jockey arm 4 comprises a tubular sleeve 21 which is rotatably mounted on the tube 8 and a pin 22 secured to the sleeve 21 is pivotally received in a hole 23 in that end of the adjacent arm 16 which lies remote from the pivot point 15 of the associated command rod 11. Removable pegs 24 inserted in holes 25 in the tube 8 prevent the sleeves 21 from sliding inboard along the tube 8 so that the pins 22 cannot become disengaged from the holes 23.

Considering the mechanism so far described, if the craft shown in Figure 1 approaches a high wave the two feeler floats 5 will rise relative to the hull 1 causing the two jockey arms 4 to pivot around the tube 8 in the direction of the arrows C (Figures 1 and 3). This pivotal movement of the jockey arms 4 causes the arms 16 to rotate about the pins 18 in the direction of the arrow D with the result that the incidence command rods 11 move in the direction of the arrow E. Movement of the incidence command rods in this direction causes the angle of incidence of the hydrofoils 2 to increase with the result that the craft will rise. In other words the hull 1 is lifted automatically over the approaching high wave detected by the feeler floats 5.

A control column 26 for manual adjustment of the angle of incidence of the hydrofoils 2 is mounted on a universal joint schematically indicated at 27. The column 26 can be moved fore and aft (in the directions of the arrows F and G, respectively) by pivoting about the shaft 28 of the universal joint 27. The column 26 may also be moved from side to side (in the direction of the arrows H and J) by pivoting about the shaft 29 of the universal joint 27. At its lower end the control column carries a transversely arranged beam 30 having a spur 31 extending from each of its ends. Each spur 31 enters a slot 32 in the arm 33 of a bell-crank lever 34, the longitudinal axes of the rotatable shafts 35 of the two bell-crank levers being aligned with one another and arranged transversely with respect to the hull 1. The other arm 36 of each bell-crank lever 34 is pivotally connected to one end of a link 37 the other end of which is pivotally connected to one end of an arm 38. The other end of each arm 38 is secured to one of the shafts 20, the arms 38 passing through slots 39 in the tube 8.

If the column 26 is moved forwardly in the direction of the arrow F both of the links 37 will move forwardly with the result that the two shafts 20 will rotate in a clockwise direction as viewed from the right with reference to Figure 3. Owing to the eccentrics 19, the rear end of each arm 16 will rise, the arms pivoting about the pins 22. As a result the incidence command rods 11 will rise, the angle of incidence of the hydrofoils 2 will decrease and the hull 1 will be lowered towards the water surface. If the control column 26 is moved rearwardly in the direction of the arrow G the hull 1 will rise from the water surface.

If the column 26 is moved to port (i. e. in the direction of the arrow H) the link 37 on the port side of the craft will move forwards and the link 37 on the starboard side will move to the rear. The angle of incidence of the port hydrofoil 2 will therefore decrease and the angle of incidence of the starboard hydrofoil 2 will increase. As a result the craft banks over to the port side. If the column 26 is moved to starboard (i. e. in the direction of the arrow J) the craft banks towards the starboard side.

Movement of the jockey arms 4 from the positions shown in Figure 1 to the positions shown in Figure 2 is effected simply by removing the pins 24 from the holes 25 in tube 8, moving the tubular sleeves 21 inboard to disengage the pins 22 from the arms 16 and then rotating the jockey arms 4 about the tube 8 until they rest on a suitable support arranged near the stern of the craft. In the craft illustrated this support consists of a beam 40 passing transversely across the craft (see Figure 2). The beam 40 may be arranged permanently in the position shown in Figure 2 or it may be placed in this position when it is required to support the jockey arms 4. In the latter case the beam 40 is conveniently stowed in the craft as shown in Figure 1 when it is not required. Of course any other suitable support may be employed in place of the beam 40, for example two horizontally arranged spars (not shown), one projecting from each side of the craft.

Movement of the struts 3 and hydrofoils 2 from the positions shown in Figure 1 to the positions shown in Figure 2 is effected simply by unlocking the struts 3 from the spars 9 and rotating them in the direction of the arrow B, this being possible by virtue of the fact that the eccentric pins 18 are received in the slots 17 in the arms 16. The struts 3 may be supported in the positions shown in Figure 2 by any suitable supporting means, such as the stays 10.

The engine and propeller unit 6 and the rear hydrofoil 7 may be raised as a single unit when the craft is travelling with its hull resting on the water (see Figure 2).

In a hydrofoil craft with automatic control of the angle of incidence of the hydrofoils such as that shown in Figures 1 to 4, I have found that it is desirable to provide means for varying the ratio between the angular movements of the jockey arms 4 and the hydrofoils 2. Figure 5 illustrates a method of varying this ratio. Referring to this figure, a small double-acting hydraulic cylinder 41 is secured to the arm 16 and the free end of the piston rod 42 of the cylinder 41 is connected to the upper end of the incidence command rod 11. The upper end of the rod 11 is, in this case, pivotally received in a slot 43 in the arm 16. By supplying fluid under pressure to one end of the cylinder 41 and exhausting fluid from the other end thereof through the pipes 44 it will be appreciated that the position of the pivoting point 15 of the command rod 11 may be varied along the slot 43 so that the ratio between the angular movements of the jockey arms 4 and the hydrofoils 2 may be varied.

I have found that it is preferable to have the pivoting point 15 closer to the pin 18 the faster the craft is travelling so that smaller angular adjustments are made to the hydrofoils 2 when the craft is travelling at a fast speed than when it is travelling at a slow speed.

I have also found that it is desirable, when the craft is turning, that the distance between the pivoting point 15 associated with the hydrofoil 2 on the inside of the turn and its associated pin 18 should be less than the corresponding distance for the hydrofoil 2 on the outside of the turn.

The above described means for varying the position of the pivoting points 15 does not prevent movement of the struts 3 to the positions shown in Figure 2 provided the pipes 44 are made of flexible material and are of sufficient length.

Figure 6 illustrates a modified arrangement of the incidence control system of Figure 3. In Figure 6 the same reference numerals are employed as in Figure 3 to designate similar items. Referring to Figure 6, the command rod 11 is formed by the piston rod of a double-acting hydraulic cylinder 45, the latter being pivotally connected to the arm 16 at the point 15. The arm 36 of the bellcrank lever 34 is connected to the piston rod 46 of a second double-acting hydraulic cylinder 47, the latter cylinder being fixed relative to the craft. The two cylinders 45 and 47 are interconnected by pipes 48 and 49 as shown. The arm 16 is not pivotally mounted on an eccentric as in the case of the arrangement according to Figure 3 but is now pivotally mounted on the shaft 20.

Automatic control of the position of the command rod 11 under the influence of the movements of the jockey arm 4 is brought about in exactly the same way as described with reference to Figure 3 except that the arm 16 now pivots on the shaft 20 instead of on the pin 18 of Figure 3. Angular movement of the arm 16 around the shaft 20 causes the cylinder 45, and with it the rod 11, to move up or down.

Movement of the control column 26 in the direction of the arrow F moves the piston rod 46 a short distance out of the cylinder 47 with the result that fluid passes from the cylinder 47 through pipe 49 to the lower end of cylinder 45 and fluid from the upper end of cylinder 45 passes to the cylinder 47 through the pipe 48. As a consequence the command rod 11 rises, the angle of incidence of the hydrofoil connected thereto is decreased and the craft is lowered towards the water surface. If the control column is moved in the direction of the arrow G, the craft rises from the water surface. Banking of the craft is effected by moving the control column 26 in the direction of the arrow J or the arrow H.

Movement of the jockey arms 4 and the struts 3 from the positions shown in Figure 1 to the positions shown in Figure 2 may be effected in the same way as described with reference to Figures 1 to 3 provided the pipes 48 and 49 are made of flexible material and are of sufficient length. Means may be provided for adjusting the position of the pivot point 15 relative to shaft 20 in a manner similar to that described above with reference to Figure 5.

Figure 7 illustrates a modified arrangement of the incidence control system of Figure 6. In Figure 7 the same reference numerals are employed as in Figures 3 to 6 to designate similar items. Referring to Figure 7, the sleeve 21 of the jockey arm 4 engages an arm 50 through the intermediary of a dog clutch 51. The arm 50 is rotatably mounted on the tube 8 and its free end is pivotally connected to the piston rod 52 of a double-acting hydraulic cylinder 53 secured to the craft. The upper end of the cylinder 53 is connected by a pipe 54 to the pipe 49 and the lower end of cylinder 53 is connected by a pipe 55 to the pipe 48. The cylinder 45 is rigidly secured to the strut 3.

Manual control of the angle of incidence of the hydrofoil 2 is controlled by the column 26 in exactly the same way as described above with reference to Figure 6. Automatic control of the angle of incidence of the hydrofoil 2, in dependence on the movements of the jockey arm 4 around the tube 8, is brought about by the cylinder 53. If the craft approaches a large wave the jockey arm 4 will rotate on the tube 8 in the direction of the arrow C. The piston rod 52 will move downwards with the result that fluid will flow from the lower end of cylinder 53 through pipes 55 and 48 to the upper end of cylinder 45 and fluid will flow into the upper end of cylinder 53 from cylinder 45 through pipes 49 and 54. Consequently the command rod 11 will move downwards and the angle of incidence of the hydrofoil 2 will be increased to lift the craft over the approaching wave. When the craft has passed over the high wave the jockey arm 4 will rotate in the direction opposite to the arrow C, the piston rod 52 will move upwards and the angle of incidence of the hydrofoil 2 will decrease.

Again it is a simple matter with the arrangement according to Figure 7 to move the jockey arms 4 and struts 3 from positions such as those shown in Figure 1 to positions such as those shown in Figure 2. The jockey arms are first moved outward a short distance on the tube 8 to release the dog clutches 51 and then rotated in the direction of the arrow C. The struts 3 can be moved to the positions shown in Figure 2 provided the pipes 48, 49, 54 and 55 are made of flexible material and are of sufficient length.

Means for varying the ratio between the angular movements of the jockey arms 4 and the hydrofoils 2 may be provided in the arrangement shown in Figure 7 by connecting the piston rod 52 to the free end of the arm 50 in the same way as the command rod 11 is connected to the arm 16 in Figure 5. The provision of such means will not affect the freedom of movement of the jockey arms and struts.

Figure 8 illustrates a safety device which comes into operation if the strut 3 strikes a heavy object when the craft is travelling at high speed on its hydrofoils. All hydrofoil boats are more exposed to danger from floating objects than normal boats and it has been proposed to provide the hydrofoil supporting struts with shear pins so that the struts swing back if they strike a heavy floating object. This saves the struts from considerable damage but has the disadvantage that as the strut swings back the angle of incidence of the hydrofoil rapidly becomes negative. If the craft has one central hydrofoil the result will be a sudden descent to the water surface, which, although being uncomfortable for the passengers, does not usually present any great danger. If, however, the craft has two forward hydrofoils, such as the craft of Figure 1, and only one strut swings back, the craft will swerve violently and the passengers may suffer considerable injury.

Figure 8 illustrates a device, which may be employed with the arrangements of Figures 6 and 7, for preventing the angle of incidence of the hydrofoil assuming a negative value if a supporting strut 3 swings rearwardly. In Figure 8 the same reference numerals are employed as in Figures 6 and 7 to designate similar items. Referring to Figure 8, a double-acting hydraulic cylinder 56 is pivotally secured at its lower end to the strut 3. The free end of the piston rod 57 of the cylinder 56 is connected to the end of an arm 58 which is rigidly secured to the tube 8. The upper end of cylinder 56 is joined by a pipe 59 to the pipe 49 and the lower end of the cylinder 56 is joined by a pipe 60 to the pipe 48.

If the strut 3 strikes a heavy floating object and swings in the direction of the arrow K around the tube 8 the piston rod 57 will be forced into the cylinder 56 with the result that fluid will flow from the lower end of cylinder 56 into the upper end of cylinder 45 and fluid from the lower end of the latter will flow into the upper end of cylinder 56. Consequently the command rod 11 will be forced down to increase the angle of incidence relative to the strut of its associated hydrofoil. The farther the strut 3 rotates in the direction of the arrow K the greater will be the increase in angle of incidence of the hydrofoil relative to the strut 3 and the result will be that the angle of incidence of the hydrofoil relative to the water remains approximately constant. Under these conditions the craft will sink to the water surface without any violent swerve.

When it is desired to move the struts 3 from positions such as those shown in Figure 1 to positions such as those shown in Figure 2 it is of course necessary to disconnect the piston rods 57 from the arms 58 by removing the pivot pins 61.

In the arrangements described above with reference to Figures 5 to 8, it will be appreciated that only those parts of the fluid systems have been shown which are necessary for the manner of operation of the arrangements to be understood. In each case the fluid systems would, of course, be provided with a fluid reservoir in the normal way.

In the various arrangements described above I have only mentioned movement of the jockey arms 4 and struts 3 from the positions of Figure 1 to the positions of Figure 2 by actual manhandling of the jockey arms and struts. It will of course be appreciated that it is a simple matter to provide for these movements to be effected from inside the craft.

In all of the arrangements described above the struts 3 are arranged to rotate about or with the tube 8. As an alternative to these arrangements, provision may be made for moving the struts 3 vertically up and down. This has the advantage that the craft may travel on its hydrofoils at different heights without having to expose an excessive length of strut to water drag. When the craft is travelling on the water surface the struts 3 would be raised to such an extent that the hydrofoils 2 would not touch the bottom when the craft is beached. A further advantage of mounting the struts 3 so that they can move vertically up and down is that it is possible to arrange the struts so that their vertical position is adjustable while the craft is actually travelling on its hydrofoils. It is thus possible to drive the craft right down on to the water surface as it is travelling along. This presents a considerable advantage over the arrangements described above with reference to the drawings in which it is necessary to stop the craft in order to move the struts 3 to their retracted positions.

The various arrangements described above all relate to craft in which the automatic adjustment of the angle of incidence of the hydrofoils is brought about through the medium of jockey arms and feeler floats. The present invention is however equally applicable to hydrofoil craft of the kind employing electrical predictor devices for varying the angle of incidence of the hydrofoils in dependence on the shape of the water surface a short distance ahead of the craft.

Again, although in the craft described above each hydrofoil 2 is mounted on a strut 3 consisting of a single member, the invention is not limited to struts of this construction. For example, the hydrofoils 2 may be supported by a strut consisting of two members arranged in parallel spaced relationship, the hydrofoil being pivotally mounted between the two strut members.

What I claim is:

1. In a hydrofoil craft including a hull, in combination, supporting means on the hull; a pair of surface feeler means, each surface feeler means including a feeler supporting means forwardly projecting from the hull and being pivotally mounted at the rear end thereof on said supporting means and a surface skimming member mounted at the forward end of said feeler supporting means; a pair of hydrofoil means mounted on the sides of the hull on said supporting means for pivotal movement independently of each other between a plurality of positions corresponding to different angles of incidence; a pair of connecting means, each connecting means connecting one of said feeler supporting means with one of said hydrofoil means so that pivotal movement of each of said feeler supporting means effects movement of the associated hydrofoil means between said positions of the same, each connecting means including an adjustable means movable between a plurality of adjusting positions for moving the associated hydrofoil means between said positions thereof independently of the position of the associated surface feeler means; and control means connected to said two adjustable means, said control means being movable in one direction for moving said two adjustable means simultaneously between corresponding adjusting positions, and being movable in another direction for moving said adjusting means in opposite directions between the respective adjusting positions so that movement of said surface feeler means results in different angles of incidence of each of said hydrofoil means.

2. An arrangement as set forth in claim 1 wherein said control means include a manually operated member mounted on the hull and being movable in said directions.

3. An arrangement as set forth in claim 1 wherein said connecting means include releasable coupling means connecting each of said feeler supporting means with the associated hydrofoil means, said coupling means being movable to a release position permitting independent pivotal movement of said surface feeler means and of said hydrofoil means into inoperative positions extending rearwardly from said supporting means.

4. In a hydrofoil craft including a hull, in combination, supporting means on the hull; a pair of surface feeler means including feeler supporting arm means pivotally mounted on said supporting means and surface skimming feeler means; a pair of downwardly projecting strut means mounted on said supporting means; a pair of hydrofoils respectively mounted at the lower ends of said strut means for pivotal movement between a plurality of positions corresponding to different angles of incidence; a pair of substantially vertical control rod means respectively connected at the lower ends thereof to said hydrofoils, said control rod means being independently movable between a plurality of vertically displaced positions for moving said hydrofoils between said positions; a pair of connecting means mounted on said supporting means, each connecting means connecting one of said feeler supporting arm means with the upper end of one of said control rod means so that pivotal movement of each feeler supporting arm means effects movement of the associated hydrofoil, each connecting means including an adjustable means adjustable between a plurality of adjusting positions for adjusting the respective control rod means relative to said supporting means and to the respective feeler supporting arm means independently of the movement of said surface feeler means; and manually operated control means connected to said two adjustable means, said control means being movable for moving said two adjustable means in opposite directions between the respective adjusting positions so that movements of said surface feeler means result in different angles of incidence of each of said hydrofoils.

5. In a hydrofoil craft including a hull, in combination, supporting means on the hull; a pair of surface feeler means including feeler supporting arm means pivotally mounted on said supporting means and surface skimming feeler means; a pair of downwardly projecting strut means mounted on said supporting means; a pair of hydrofoils respectively mounted at the lower ends of said strut means for pivotal movement between a plurality of positions corresponding to different angles of incidence; a pair of substantially vertical control rod means respectively connected at the lower ends thereof to said hydrofoils, said control rod means being independently movable between a plurality of vertically displaced positions for moving said hydrofoils between said positions; a pair of connecting means mounted on said supporting means, each connecting means connecting one of said feeler supporting arm means with the upper end of one of said control rod means so that pivotal movement of each feeler supporting arm means effects movement of the associated hydrofoil, each connecting means including an adjustable means adjustable between a plurality of adjusting positions for adjusting the respective control rod means relative to said supporting means and to the respective feeler supporting arm means independently of the movement of said surface feeler means; and manually operated control means connected to said two adjustable means, said control means being movable in one direction for moving said two adjustable means in opposite directions between the respective adjusting positions so that movements of said surface feeler means results in different angles of incidence of each of said hydrofoils, said control means being movable in another direction for moving said two adjustable means simultaneously between corresponding adjusting positions.

6. An arrangement as set forth in claim 5 wherein said connecting means include lever means connected at one end thereof to said feeler supporting arm means and being pivotally mounted on said supporting means, and wherein said adjustable means is a hydraulic piston and cylinder means connecting the other end of said lever means with the upper end of said control rod means, said piston and cylinder means being movable between said adjusting positions; and wherein said control means include hydraulic means connected to said piston and cylinder means for operating the same.

7. An arrangement as set forth in claim 5 and including coupling means connecting said strut means with said supporting means and being movable to a releasing position permitting independent pivotal movement of said feeler supporting arm means and of said strut means into an inoperative position extending rearwardly from said supporting means.

8. An arrangement as set forth in claim 5 wherein each of said connecting means includes a lever means connected at one end thereof to said feeler supporting arm means and having at the other end thereof a slot, a pin means connected to the upper end of said control rod means and slidable in said slot, and operating means for moving said pin means in said slot, said lever means being pivotally mounted intermediate the ends thereof on said supporting means whereby the ratio between angular movement of said feeler supporting arm means and said hydrofoils can be adjusted by said operating means.

9. In a hydrofoil craft including a hull, in combination, supporting means on the hull; a pair of surface feeler means including feeler supporting arm means pivotally mounted on said supporting means and surface skimming feeler means; a pair of downwardly projecting strut means mounted on said supporting means for turning movement about a horizontal axis; a pair of hydrofoils respectively mounted at the lower ends of said strut means for pivotal movement between a plurality of positions corresponding to different angles of incidence; a pair of substantially vertical control rod means respectively connected at the lower ends thereof to said hydrofoils, said control rod means being independently movable between a plurality of vertically displaced positions for moving said hydrofoils between said positions; a pair of connecting means mounted on said supporting means, each connecting means connecting one of said feeler supporting arm means with the upper end of one of said control rod means so that pivotal movement of each feeler supporting arm means effects movement of the associated hydrofoil, each connecting means including a lever means pivotally connected at one end thereof to one of said feeler supporting arm means and being pivotally mounted on said supporting means, and an adjustable hydraulic piston and cylinder means connecting the other end of said lever means to the upper end of one of said control rod means, said piston and cylinder means being movable between a plurality of adjusting positions; control means including hydraulic means and a pair of conduit means connecting said hydraulic means with said piston and cylinder means for moving the latter between said adjusting positions; a cylinder pivotally connected to each of said strut means; a piston means movable in said cylinder and including a piston rod fixedly connected to said supporting means rearwardly of said strut means; and other conduit means connecting the ends of said cylinder with said first-mentioned conduit means whereby rearward turning movement of each of said strut means effects an increase of the angle of incidence of the associated hydrofoil for maintaining the angle of incidence substantially constant when one of said strut means engages an obstacle.

10. In a hydrofoil craft including a hull, in combination, supporting means on the hull; a pair of surface feeler means including feeler supporting arm means pivotally mounted on said supporting means and surface skimming feeler means; a pair of downwardly projecting strut means mounted on said supporting means; a pair of hydrofoils respectively mounted at the lower ends of said strut means for pivotal movement between a plurality of positions corresponding to different angles of incidence; a pair of substantially vertical control rod means respectively connected at the lower ends thereof to said hydrofoils, said control rod means being independently movable between a plurality of vertically displaced positions for moving said hydrofoils between said positions; a pair of connecting means mounted on said supporting means, each connecting means connecting one of said feeler supporting arm means with the upper end of one of said control rod means so that pivotal movement of each feeler supporting arm means effects movement of the associated hydrofoil, each connecting means including a lever means pivotally connected at one end thereof to one of said feeler supporting arm means and being pivotally mounted on said supporting means, and an adjustable hydraulic piston and cylinder means connecting the other end of said lever means to the upper end of one of said control rod means, said piston and cylinder means being movable between a plurality of adjusting positions; and control means including a pair of hydraulic means respectively connected to said two piston and cylinder means for moving the same between said adjusting positions, and manually operated means for operating said pair of hydraulic means to move said piston and cylinder means selectively in opposite directions and in the same direction between said adjusting positions.

References Cited in the file of this patent

UNITED STATES PATENTS

| | | |
|---|---|---|
| 811,743 | Reeve | Feb. 6, 1906 |
| 1,875,135 | Plum | Aug. 30, 1932 |
| 2,228,311 | Gwinn | Jan. 14, 1941 |
| 2,387,907 | Hook | Oct. 30, 1945 |
| 2,584,347 | Hazard | Feb. 5, 1952 |
| 2,603,179 | Gardiner | July 15, 1952 |
| 2,722,189 | Hobday | Nov. 1, 1955 |

FOREIGN PATENTS

| | | |
|---|---|---|
| 458,111 | Great Britain | Dec. 14, 1936 |
| 472,717 | France | Aug. 17, 1914 |
| 493,373 | Great Britain | Oct. 6, 1938 |
| 591,933 | Great Britain | Sept. 2, 1947 |